(12) United States Patent
Schmitz et al.

(10) Patent No.: US 6,706,390 B1
(45) Date of Patent: Mar. 16, 2004

(54) SILICONE CONTACT ADHESIVE WITH REDUCED COLD FLOW

(75) Inventors: Christoph Schmitz, Rheinbrohl (DE); Stefan Bracht, Ochtendung (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 0 days.

(21) Appl. No.: 09/719,731

(22) PCT Filed: Feb. 26, 1999

(86) PCT No.: PCT/EP99/01246

§ 371 (c)(1), (2), (4) Date: Sep. 20, 2001

(87) PCT Pub. No.: WO99/47619

PCT Pub. Date: Sep. 23, 1999

(30) Foreign Application Priority Data

Mar. 14, 1998 (DE) .......................................... 198 11 218

(51) Int. Cl.⁷ ............................................... B32B 27/06

(52) U.S. Cl. .................... 428/355 R; 428/447; 427/387

(58) Field of Search ........................... 428/447; 427/387

(56) References Cited

U.S. PATENT DOCUMENTS

| 5,232,702 A | 8/1993 | Pfister et al. |
| 5,668,212 A | 9/1997 | Naito |
| 6,407,195 B2 * | 6/2002 | Sherman et al. ............... 528/28 |

FOREIGN PATENT DOCUMENTS

| EP | 0 280 423 | 8/1988 |
| EP | 0 667 382 A1 | 8/1995 |
| JP | 55-060556 | 10/1978 |

* cited by examiner

Primary Examiner—Robert Dawson
Assistant Examiner—Christopher Keehan
(74) Attorney, Agent, or Firm—D. Peter Hochberg; Sean Mellino; Katherine R. Vieyra

(57) ABSTRACT

In a process for the production of polysiloxane pressure-sensitive adhesive layers with reduced cold flow by means of coating and drying a one-component polysiloxane pressure-sensitive adhesive solution onto a suitable flat-shaped carrier, a complex of a metal ion of the group consisting of calcium, magnesium, zinc, aluminum, titanium, zirconium or hafnium with a low-molecular organic complex former is added to the organic adhesive solution to be coated, whereby the metal ion is only released from the bond to the complex former under the conditions of heating and/or drying of the adhesive solution.

11 Claims, 5 Drawing Sheets

SILICONE CONTACT ADHESIVE WITH REDUCED COLD FLOW

Figure 1:
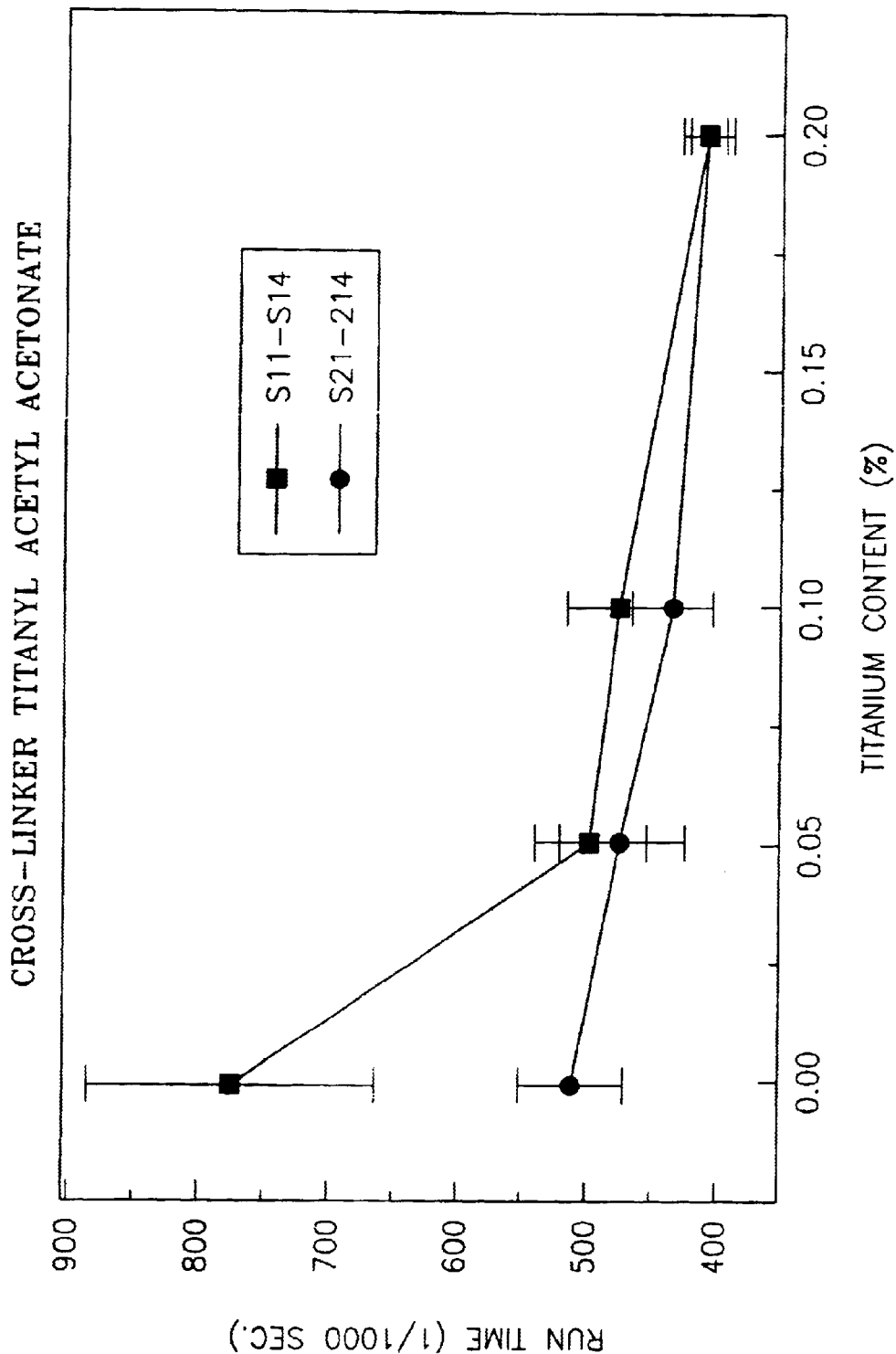

The invention relates to reagents for cross-linking pressure-sensitive adhesive formulations on the basis of silicone polymers.

Apart from other technical applications, such pressure-sensitive adhesive formulations are mainly employed in the manufacture of medicinal patches. Among the medicinal patches, these silicone pressure-sensitive adhesives which are cross-linked in a novel manner are especially suited for the production of active substance-containing medicinal patches, i.e. of transdermal therapeutic systems (TTS).

The described cross-linking reagents are employed according to the invention in the solvent containing coating and drying of pressure-sensitive silicone adhesive formulations.

It is only under these conditions that the reagents develop their cross-linked action, which results in the formation of a three-dimensional polymer network.

The resultant pressure-sensitive adhesive layers thereby lose their flowability—their so-called "cold flow".

Cold flow is an undesirable phenomenon because when it occurs, two surfaces bonded to each other by a pressure-sensitive adhesive layer can be displaced relative to each other even under the influence of gravity, so that a position-constant bond between these surfaces cannot be ensured.

In the case of TTS, this problem especially concerns the adhesive bonding of the system to the application site on humans or animals. Furthermore, when cold flow sets in within the silicone adhesive layer comprised in the TTS, the influence of gravity and of cohesion and adhesion forces can result in undesirable deformation and shifting within the system even during storage.

It has now surprisingly been found that the cross-linked reagents employed in the cross-linked of polyacrylate-based pressure-sensitive adhesives can also be successfully used with silicone polymers, despite the fact that the chemical properties of said silicone polymers are fundamentally different from those of polyacrylates.

organometallic complexes of certain metal cations have proved to be especially effective. Among these, complexes of metals such as aluminum, titanium, zirconium or zinc are particularly preferred according to the invention. As an organic complex former, acetylacetone is particularly suited for medical application.

The cross-linked reagents are added to the solution of the silicone pressure-sensitive adhesive and develop their cross-linked action only after the solvents or stabilizing additives have been removed by drying.

Pressure-sensitive adhesives based on silicone polymers are of particular significance in medical application. This is due to their excellent dermatological compatibility with regard to the triggering of skin irritations and immunological reactions (sensibilization, allergization). In addition, silicone pressure-sensitive adhesives are products which adhere to human skin reliably and over a longer period of time, up to several days. Their strongly water-repellent nature also plays a role in this context.

In the TTS field, silicone pressure-sensitive adhesives stand out for their good chemical compatibility with pharmaceutical active agents and auxiliary substances, which promotes the chemical stability and storability of products based on said adhesives. The unusually high permeability (diffusibility) of the silicone polymers, which facilitates the release of contained active and auxiliary agents, is also of particular significance.

Besides these advantages, the silicone pressure-sensitive adhesives available on the market for medicinal application (e.g. product line Bio-PSA Q7 by Dow Corning Company) show considerable deficits as regards their rheological properties.

These products are polysiloxane-based polymers exhibiting no three-dimensional cross-linked or only one limited to microscopic areas. They have a structure that is substantially threadlike and branched to only a small extent or not at all.

This is necessary so that the products can be dissolved at all in organic solvents such as e.g. short-chain alkanes (heptane, petrol) or ethyl acetate, and so that they can be subjected to solvent containing processing.

Furthermore, these prior art polymers are one-component polymer solutions.

One-component means that the polymers contained in the solution are not intended, in their further processing; for a two-component reaction in the known sense of resin and hardener.

One-component does not however, mean that the solution may not contain more than one type polysiloxane polymer, optionally also in admixture with chemically different polymers (e.g. polyacrylates). The procedures employed in the processing of one-component polysiloxane pressure-sensitive solutions described in the following must not be confused with those procedures and catalysts that have been described in manifold ways for two-component silicone adhesives. Such systems contain at least two different types of polysiloxane which are intended, during their further processing, for a reaction yielding a three-dimensional polymer network in the sense of resin and hardener.

The term polysiloxane also comprises mixed polymers of polysiloxane to whose polymer chains chemically different sections, for example on the basis of polyethylene oxide, polypropylene oxide, polyvinyl pyrrolidone or poly(meth)acrylate, are incorporated or added.

In the field of TTS production, the processing of polysiloxane pressure-sensitive adhesive solutions comprises spreading and drying to form thin, pressure-sensitive polymer films.

In the processed state, the lack of three-dimensional cross-linked proves a disadvantage, as the threadlike polymer chains retain a certain flowability, even if an extremely slow one. This is referred to as "cold flow" by the experts since it occurs even at room temperature.

The following forces can all promote such a flow:
1. gravity
2. all mechanical forces that may have an effect on the product during production or storage,
3. adhesion forces between the pressure-sensitive polymers and the surfaces they cover (resulting in contraction or spreading)
4. cohesion forces in the polymer itself (contraction).

Cold flow practically always has disadvantageous effects during the storage of TTS, which may typically be for a period of two years or more. In this way, e.g. conglutination of the products with their packages may result.

The phenomenon also undesirably arises upon application to the human or animal skin, especially promoted by the warm body temperature. When the TTS is worn for several hours or days, the result may be a displacement thereof caused by the TTS practically flowing over the skin. Furthermore, the silicone pressure-sensitive adhesive may spread on the skin by slowly flowing beyond the area originally provided with adhesive This frequently leads to residue remaining on the skin along the marginal area of the system after removal of the system. This residue is regarded as extremely annoying by the user.

The problem of cold flow in silicone pressure-sensitive adhesives is known. U.S. Pat. No. 5,232,702 describes a large number of possible countermeasures. The document mentions various types of fillers and additives; however, none of these is described as a cross-linked reagent.

In connection with activesubstance systems, cross-linked reactions are even expressly described as being problematic or impossible because the required temperatures are too high or because of a lacking biocompatibility of the reagents (column 5, lines 3–10).

A great number of other cohesion-enhancing measures are described instead.

As these measures do not, in practice, always enable the control of the problem, it was the object of the invention to provide novel and more efficient methods for suppressing cold flow in silicone pressure-sensitive adhesives.

This object is surprisingly achieved by adding reagents which are employed for the suppression of cold flow in a chemically completely different family of pressure-sensitive adhesive polymers, namely polyacrylates.

This transferred applicability was not to be expected since polysiloxane, as the skeletal structure of silicone polymers, are of a completely different chemical nature than polyacrylates, which are built up of pure hydrocarbon chemistry.

It is known to those skilled in the art that with polyacrylate pressure-sensitive adhesives containing tree carboxyl or hydroxyl groups bound to the polymer, it is possible to attain three-dimensional cross-linked of polymer chains by addition of multivalent ions, e.g. of calcium, magnesium or zinc, but especially of aluminum and the elements of the 4th subgroup, titanium, zirconium and hafnium. Aluminum only occurs as a trivalent ion; as regards the elements of the 4th subgroup, the stable oxidation state +4 is employed.

In this way it becomes possible to postpone the conversion of the bed of threadlike polymer chains into a no longer flowable three-dimensional network until the drying from a solution is carried out.

To be able to use the metal ions in mostly organic solvents on the one hand, and on the other hand to prevent a premature cross-linked reaction in the polymer solution, organic, low-molecular complex formers are employed to which the metal ions are initially bound. Among these complex formers, acetylacetone assumes a special role in the field of medicine, as it is of relatively uncritical toxicology and, in addition, can be readily removed from the product in drying processes. Acetylacetone is, in its chemical enol form, a vinylogous acid and forms complexes with the metal ions—the corresponding acetylacetonates. These complexes are of their own chemical nature, with particular stability, and cannot be compared to common salts of organic acids with the respective metals.

Aluminum acetylacetonate and titanyl acetylacetonate are used to cross-link polyacrylate pressure-sensitive adhesives during drying from organic solvents.

In the course of the cross-linked, a transfer of the metal ions from the complex former to the functional groups of the acrylate polymer takes place, whereby several functional groups on different polymer chains are cross-linked.

With regard to the cross-linked reagents aluminum acetylacetonate and titanyl acetylacetonate, which are very frequently used with polyacrylates, it has now surprisingly been found that they have a practically identical effect, phenomenologically, when used with polysiloxane, despite the fact that these have an entirely different chemistry: the flowability of silicone pressure-sensitive adhesives is significantly reduced.

The characteristics of this change in the case of polysiloxane are so similar to those in the case of polyacrylates that one may assume that a three-dimensional cross-linking takes place—via a mechanism the details of which are not known.

The novel manner of cross-linked was tested on two groups of silicone pressure-sensitive adhesives that are of particular significance for medical application: on pressure-sensitive adhesives on the basis of polydimethyl siloxane, in a nonaminecompatible form on the one hand and on the other hand in an aminecompatible form.

The non-amine-compatible form is characterized in that a remainder of silanol groups (hydroxyl groups bound to silicon) remains in the polymer upon polymerization. This is the standard type which is capable of undesired reaction with primary, secondary or tertiary amine groups via the silanol groups.

As many pharmaceutical active substances contain amine groups, aminecompatible types are available especially for application in TTS. These are subjected to a so-called end-capping: the silanol groups are deactivated through suitable reagents, e.g. by addition of a trimethylsilyl group.

A pressure-sensitive adhesive on the basis of a polyacrylate with a low proportion of free carboxyl groups was used for comparison. The three-dimensional cross-linkability of such acrylates through the cross-linkers discussed here is commonly known to those skilled in the art.

The following formulations were examined:

| | | | | |
|---|---|---|---|---|
| cross-linker: Al-acetylacetonate [% $Al^{3+}$ (w/w)] | — | 0.01 | 0.025 | 0.05 |
| polyacrylate pressure-sensitive adhesive Durotak 387-2051 | A11 | A12 | A13 | A14 |
| silicone pressure-sensitive adhesive Bio-PSA Q7-4602 | S31 | — | — | S32 |
| cross-linker: Ti-acetylacetonate [% $Ti^{4+}$ (w/w)] | — | 0.05 | 0.1 | 0.2 |
| silicone pressure-sensitive adhesive Bio-PSA Q7-4602 | S11 | S12 | S13 | S14 |
| silicone pressure-sensitive adhesive Bio-PSA Q7-4301 | S21 | S22 | S23 | S24 |

Al = aluminum; Ti = titanium

The indicated cross-linker concentrations relate to the dried adhesive mass. Bio-PSA Q7-4602, produced by Dow Corning, is the solution of a non-aminecompatible pressure-sensitive silicone adhesive in ethyl acetate. Product 4301 differs from the above in that it is aminecompatible. The solvent used here is heptane. Durotak 387-2051, produced by National Starch, is the solution of a polyacrylate pressure-sensitive adhesive in a mixture of ethyl acetate and heptane without the addition of a cross-linker.

The adhesive masses were produced by adding the corresponding amount of a 2% solution of titanyl acetylacetonate in ethanol or a 4% solution of aluminum acetylacetonate in ethyl acetate to the adhesive solution and subsequent mixing.

The viscous adhesive solutions were spread in a thin layer onto a polyethylene terephthalate film (Hostaphan RN 100, produced by Hoechst) with the help of a suitable filmstripping frame and dried for 10 minutes at 80° C. in an exhaust-air oven. For all formulations, the layer thickness was adjusted so that the resultant weight per unit area of the dried film was 60 g/m$^2$±5%. This corresponds to 6 mg/cm$^2$ and a layer thickness of approximately 60 µm.

With all of the tested pressure-sensitive adhesives, the coating onto polyethylene terephthalate results in a bond that can mechanically barely be dissolved. Alternately, the pressure-sensitive adhesive films were also, under otherwise identical conditions, produced on a carrier film equipped with a nonstick finish through coating with a fluorated polymer (ScotchPak 1022, produced by 3M). Under these conditions, the pressure-sensitive adhesive film can easily be mechanically removed form the carrier film and subjected to further processing.

The effects of the cross-linked additive were examined in the thus produced pressure-sensitive adhesive layers with two measuring methods, pertaining to apparatus:

The tack or tackiness of a pressure-sensitive adhesive describes its ability to spontaneously adhere to a surface.

This spontaneous tackiness, resulting after only an extremely short period of contact without any notable exertion of pressure, depends considerably on the flowability of the pressure-sensitive adhesive. A high flowability enables a rapid establishment of contact, covering the microstructure of a substrate surface in its entirety, and thus results in a high tack. Flowability is not the only characteristic determining the tack, but it is the most important.

The "rolling ball" method is a suitable measuring method for registering the tack. In this method, a ball made of a suitable material is provided with a starting speed and then let roll over the pressure-sensitive adhesive affixed to a planar carrier in a thin layer.

The distance after which the ball comes to a halt through the braking effect of the pressure-sensitive adhesive, which depends on the tack, can be evaluated, or else the time can be measured that the ball needs to cover a certain distance without coming to a standstill within this distance. The results of this second variation are not distorted by the often erratic course of the ball's "getting stuck".

The run time of the ball was measured on an inclined plane (glass plate with a strength of 1 cm) with an adjustable angle of inclination over a distance of 59 cm. with a defined preliminary distance of 17.5 cm, the ball was let roll onto the pressure-sensitive adhesive film, which was affixed to a polyethylene terephthalate film.

The run time was measured between two modulated infrared light barriers by means of a connected electronic timer with a display of 1/1000 seconds.

At an inclination angle of 35°, using a high quality steel rolling element bearing ball with a diameter of 18 mm, the run times shown in FIG. 1 were determined as the median values of 6 measurements each. For all three types of adhesive, the measurements show a decrease in the run time correlated to the increase of the cross-linker concentration. Thus, the tack of pressure-sensitive silicone adhesives decreases through the addition of cross-linkers in a way as would have been expected, in theory, for a cross-linked and thus reduction of the flowablilty of the polymer, and as also becomes evident in the known example of the cross-linked of the polyacrylate (A11–A14).

This especially holds true for the non-amine-compatible silicone adhesive (S11–S14), but definitely also for the amine-compatible variety (S21–S24).

In addition, it becomes evident that the cross-linked is especially effective in the concentration range of up to 0.05% and also between 0.05% and 0.1% of aluminum.

Figure 2:
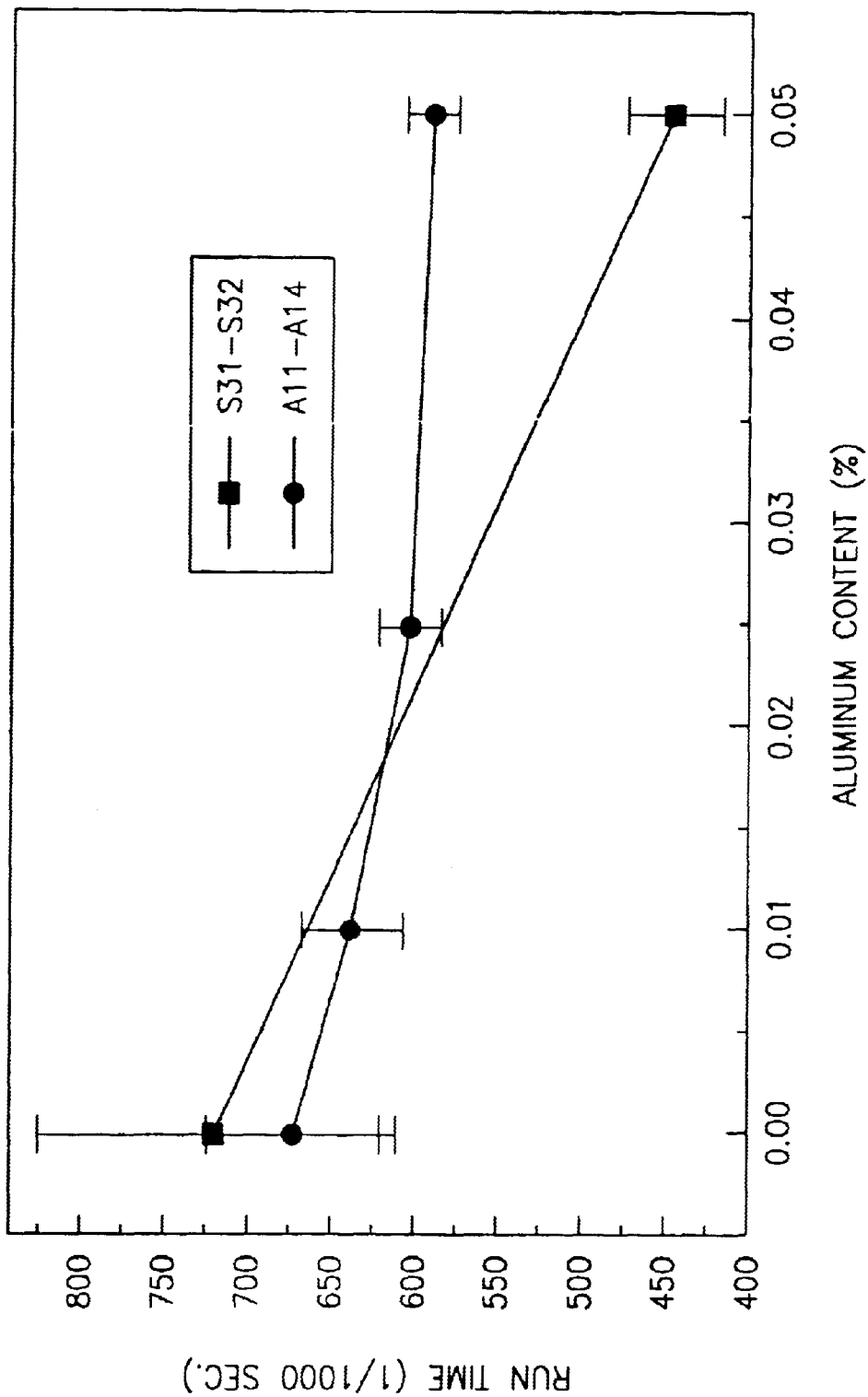

The use of aluminum based cross-linkers (S31+S32) instead of titaniumbased ones (S11+S12) with silicone pressure-sensitive adhesives turns out to equally effective (FIG. 2).

In addition, the shear strength of the produced pressure-sensitive adhesive films was tested.

If a shear force is applied to uncross-linked, threadlike, flowable polymers, a slow flowing of the film occurs. As long as the shearing is not too fast and the film does not tear, the application of a constant shear force results in an almost constant flow speed.

In the case of a three-dimensional cross-linked of the polymer chain, on the other hand, the viscous proportion is almost entirely lost, and only an elastic deformation can occur. An increase of the shear force finally leads to a mechanical tearing apart of the polymer structure up to a tearing apart of the entire film.

Thus, cross-linked and uncross-linked pressure-sensitive adhesive films show very different characteristics regarding their behavior upon shearing.

Figure 3:
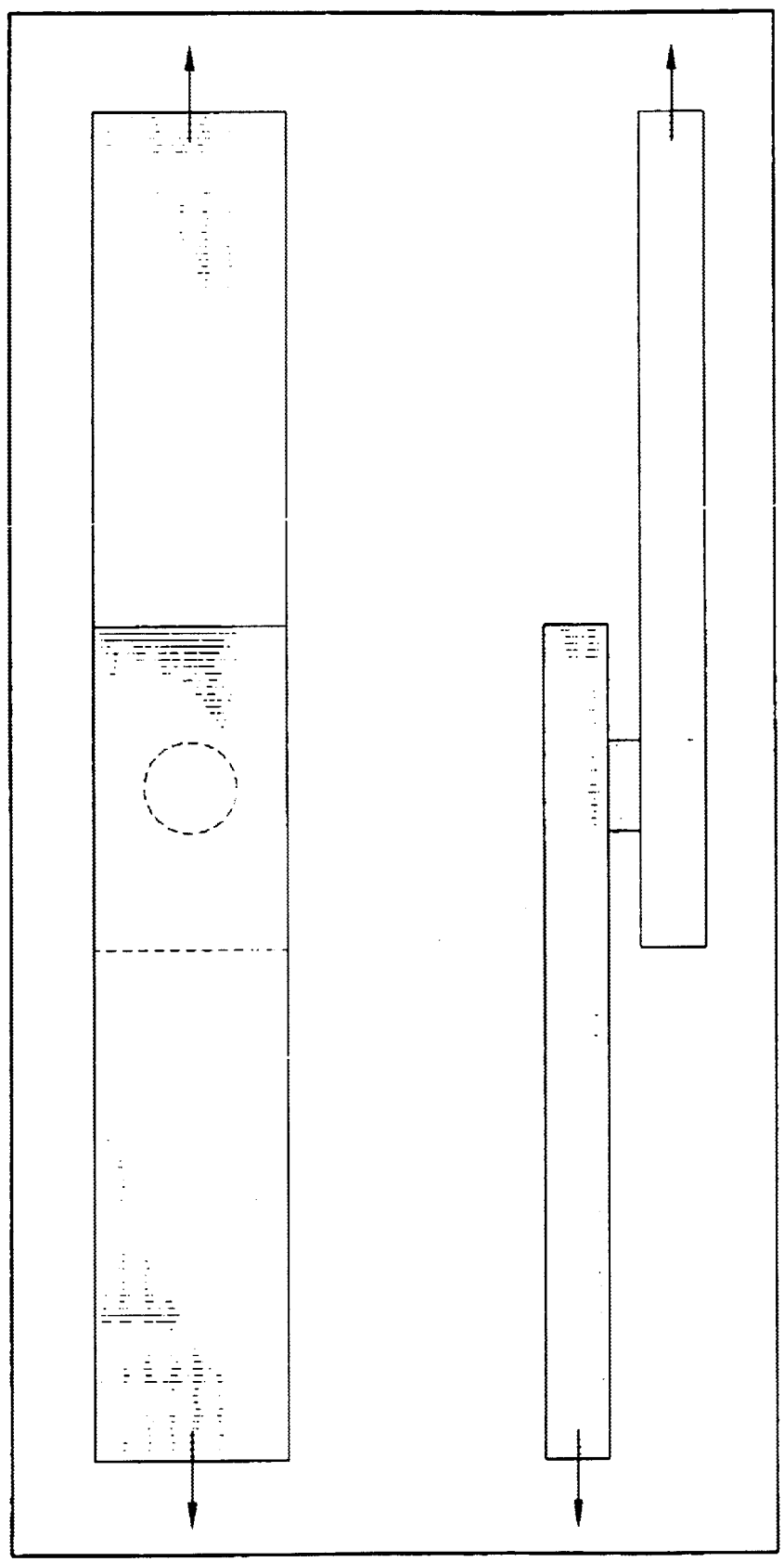

To examine this behavior, round cutouts with a diameter of 12 mm were removed from the produced pressure-sensitive adhesive films. These round pieces of film were fixed between two strips of a polyethylene terephthalate film (Hostaphan RN 100, produced by Hoechst) as shown in FIG. 3. After clamping this arrangement into a commercial tensile testing machine (universal testing machine 81803, produced by Frank, Weinheim), the shear force per time which was necessary to achieve a constant shear speed of 2.5 m/min was measured. The thus obtained force distance diagrams of 6 individual measurements each are shown in FIGS. 4 to 7.

Figure 4:
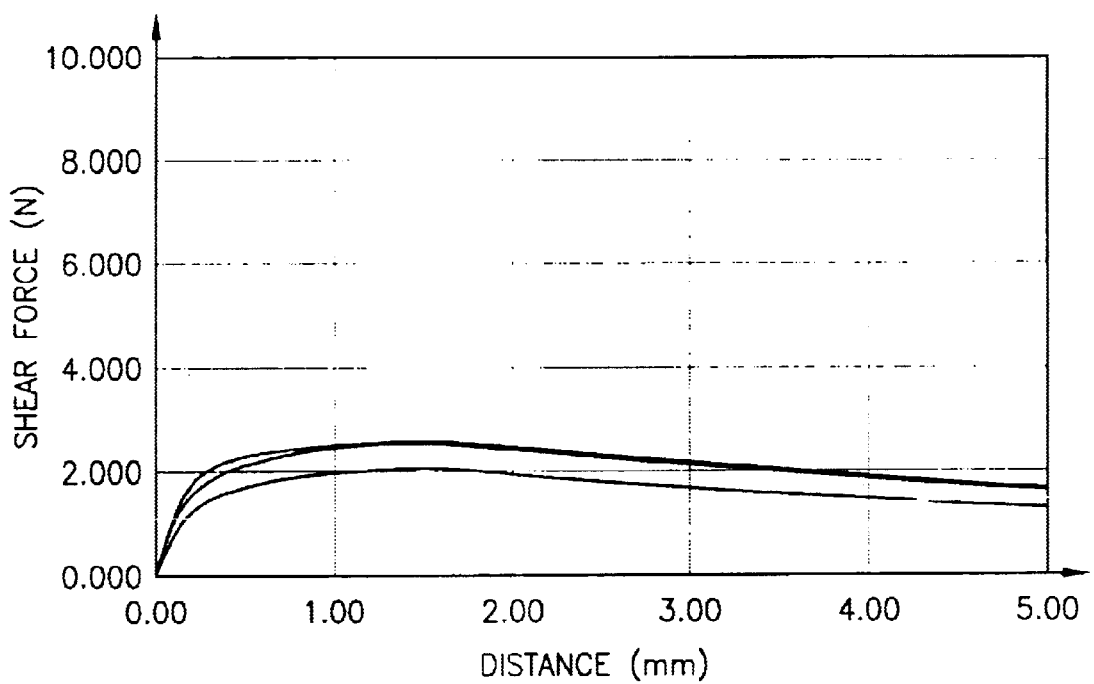

In the case of the polyacrylate serving as reference, in the uncross-linked state a constant shear force is established after a short time which must be applied to maintain the predetermined constant shear speed; the polymer flows (FIG. 4).

Figure 5:
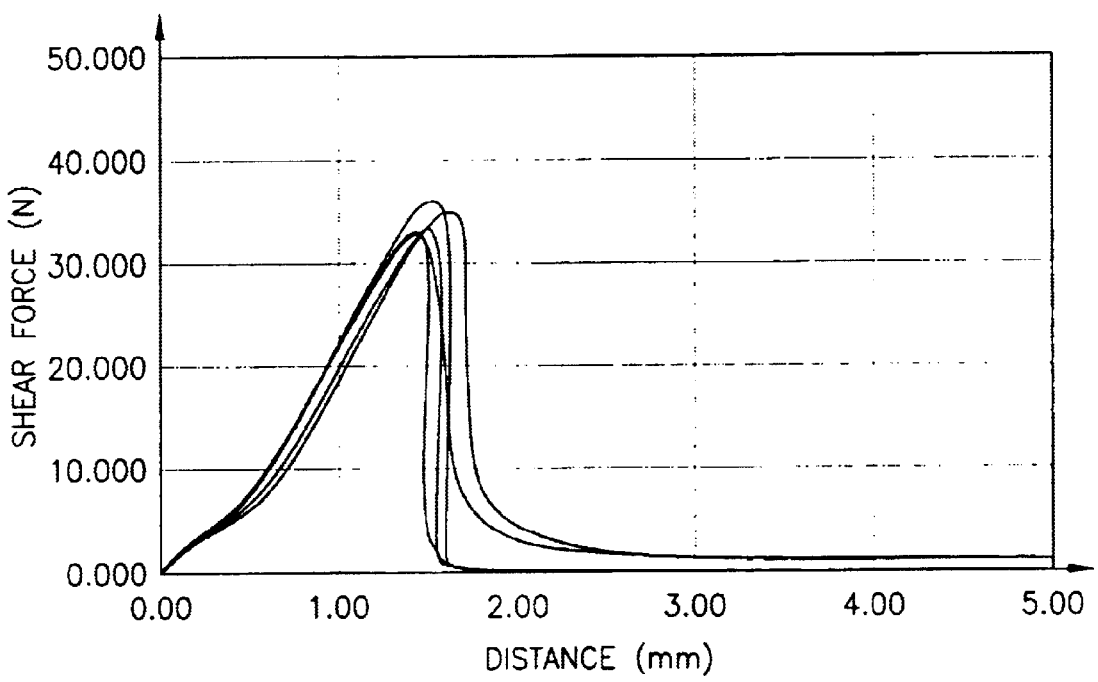

In the cross-linked state, on the other hand, the shear force rapidly increases under elastic deformation until finally, the elastic expandability of the film is exceeded and the film tears, whereby the shear force rapidly drops off towards zero (FIG. 5).

Figure 6:
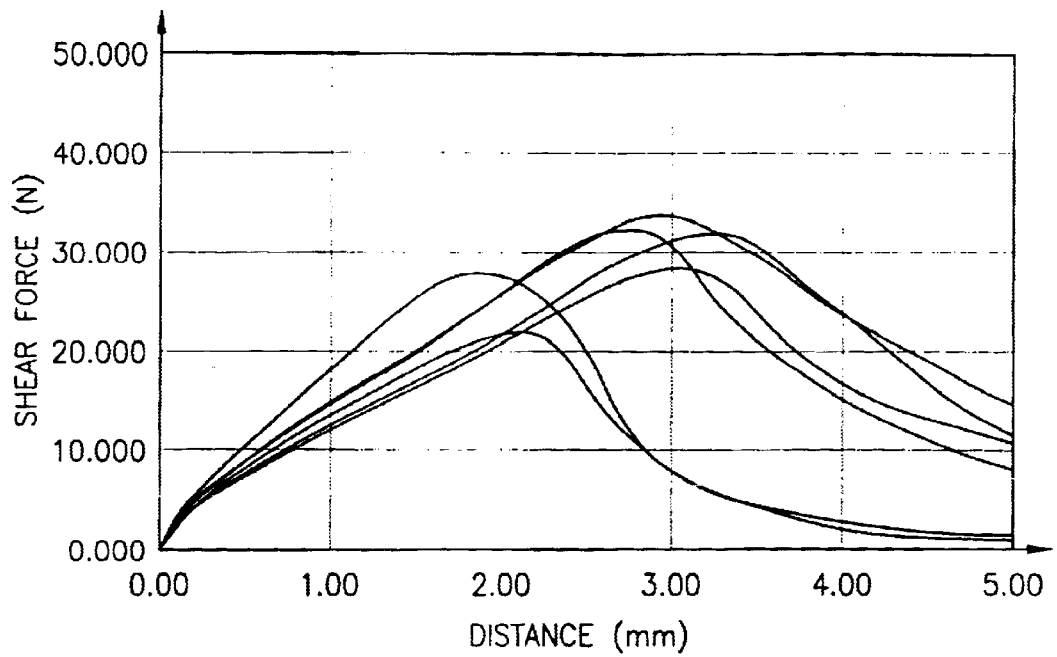

The silicon film without a cross-linked additive shows a behavior very similar to that of the uncross-linked polyacrylate film: here, too, under a certain shear force the predetermined shear speed is maintained under flowing. The necessary forces are simply situated at a higher level, and the "energy barrier" for transition from the state of rest to a flowing movement is more distinct than with the uncross-linked polyacrylate (FIG. 6). This could be related to the different chain lengths and different intermolecular interaction forces of both polymer types.

Figure 7:
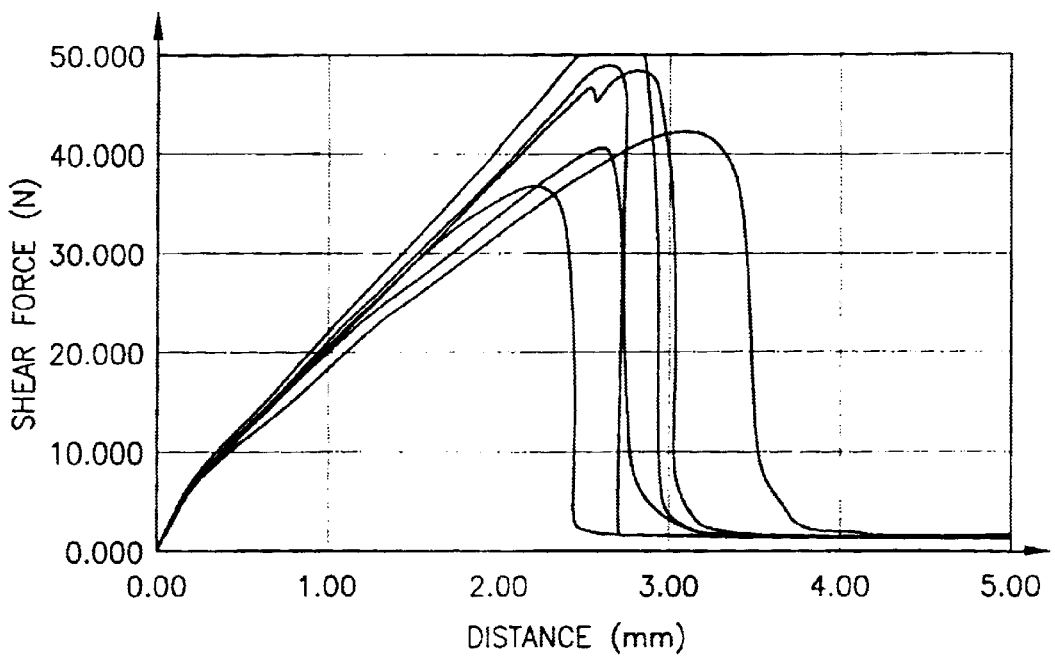

What is decisive, however, is the characteristic change of the course in a cross-linkercontaining silicone film. Very similarly to the cross-linked polyacrylate, a shear force is established under elastic deformation which finally drops off towards zero upon tearing of the film (FIG. 7). This is evident proof that the silicone pressure-sensitive adhesive film is no longer flowable after addition of the cross-linker titanyl acetylacetonate.

What is claimed is:

1. Process for the production of polysiloxane pressure-sensitive adhesive layers with a reduced cold flow by means of coating and drying a one-component polysiloxane pressure-sensitive adhesive solution onto a suitable flat-shaped carrier, wherein a complex of a metal ion of the group consisting of calcium, magnesium, zinc, aluminum, titanium, zirconium or hafnium with a low-molecular organic complex former is added to the organic adhesive solution to be coated, whereby the metal ion is only released from the bond to the complex former under the conditions of heating and or drying of the adhesive solution.

2. Process according to claim 1, wherein the metal ion amounts to at least 0.005 wt-%, relative to the dried adhesive mass.

3. Process according to claim 1, wherein the metal ion is provided in an amount of 0.005 to 0.5 wt-%, relative to the dried adhesive mass.

4. Process according to claim 1, wherein the organic complex former is substantially removed during drying.

5. Process according to claim 1, where the drying is carried out at a temperature of between 20 and 120° C.

6. Process according to claim 1, wherein the weight per unit area of the dried film is between 10 and 300 gm$^2$.

7. Process according to claim 1, wherein the organic complex former is acetylacetone or that acetylacetone participates in the complex forming.

8. Process according to claim 1, wherein the metal participating in the complex is aluminum or titanium.

9. Process according to claim 1, wherein the polysiloxane is substantially polydimethyl siloxane.

10. Process according to claim 1, wherein the free silanol groups present in the polydimethyl siloxane are chemically deactivated through a suitable endcapping and are thus amine-resistant.

11. Medicinal patch, having a layered structure said structure having at least one layer of a polysiloxane pressure-sensitive adhesive produced by means of a process defined in claim 1.

* * * * *